May 27, 1941.　　D. G. H. WADDINGTON　　2,243,689
PHOTOGRAPHIC CAMERA
Filed July 8, 1933　　4 Sheets-Sheet 1
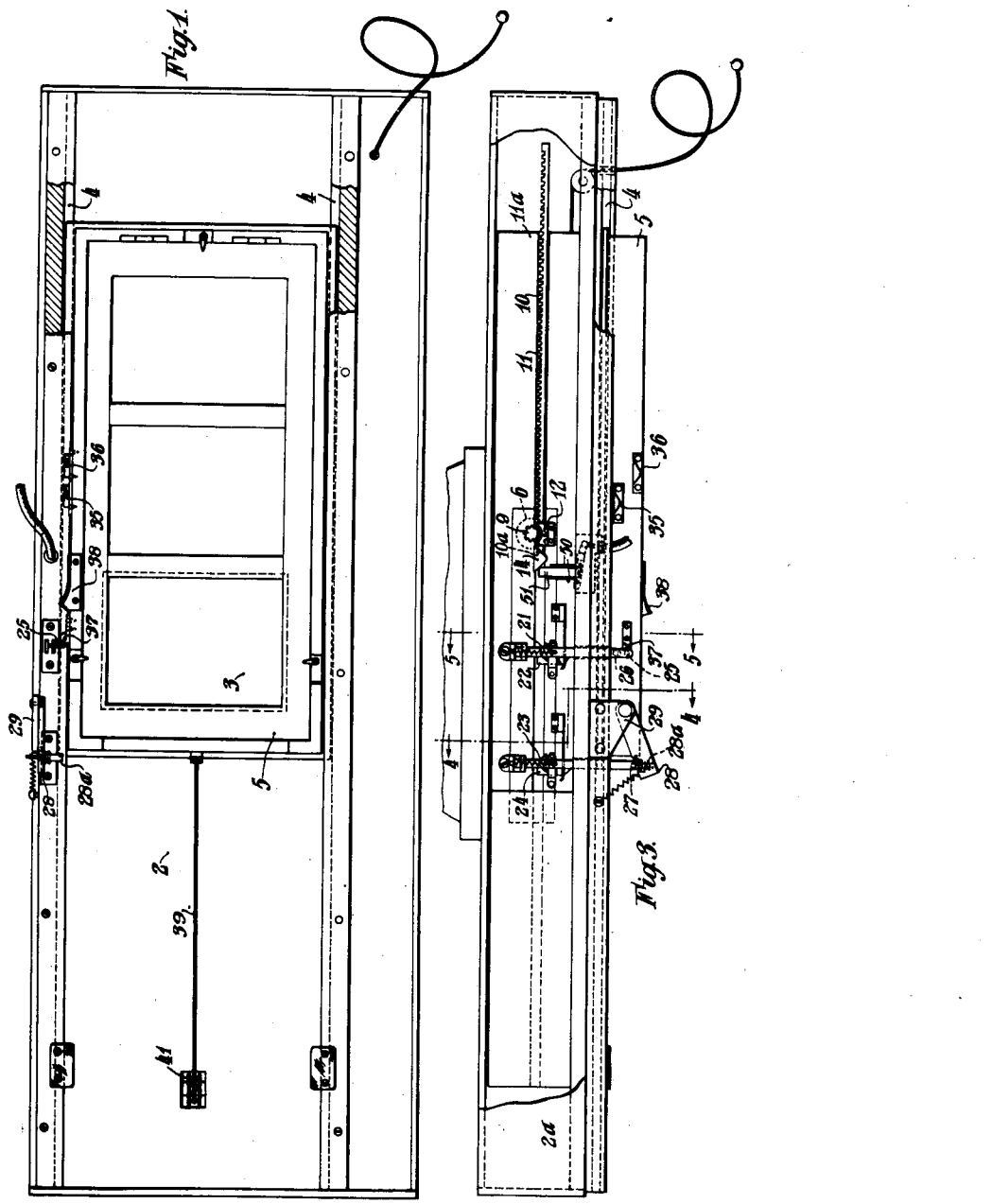
INVENTOR:
DAVID GEORGE HENRY WADDINGTON
BY: Francis E. Boyce
ATTORNEY May 27, 1941. D. G. H. WADDINGTON 2,243,689
PHOTOGRAPHIC CAMERA
Filed July 8, 1933 4 Sheets-Sheet 2

INVENTOR:
DAVID GEORGE HENRY WADDINGTON
BY: Francis C. Boyce
ATTORNEY

May 27, 1941.  D. G. H. WADDINGTON  2,243,689
PHOTOGRAPHIC CAMERA
Filed July 8, 1938  4 Sheets-Sheet 3
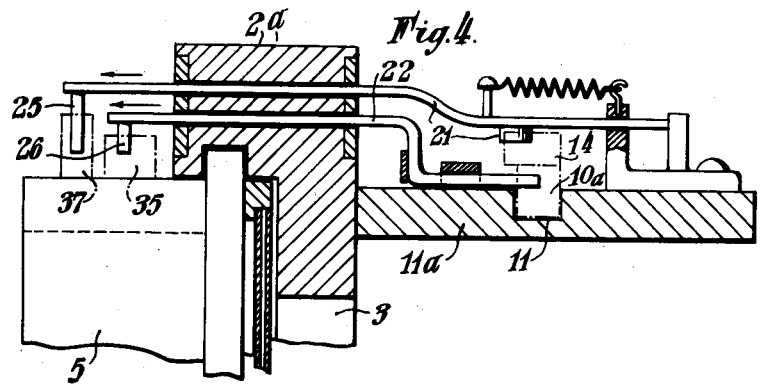
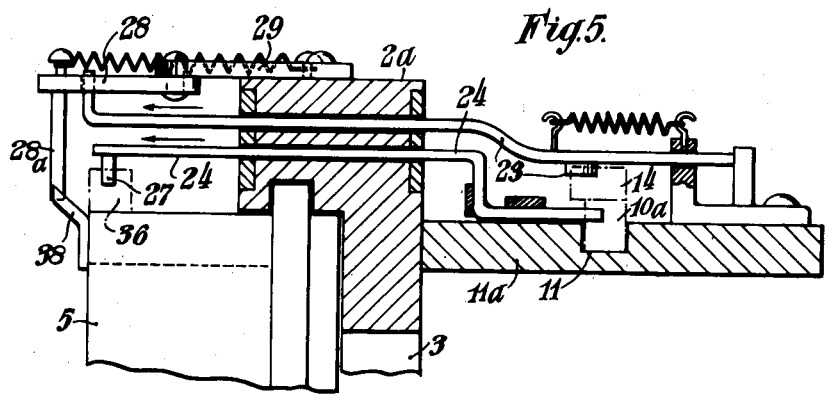
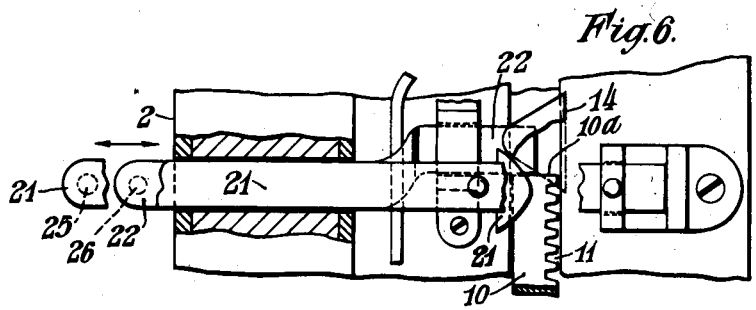
INVENTOR:
DAVID GEORGE HENRY WADDINGTON
BY: Francis E. Boyce
ATTORNEY May 27, 1941.  D. G. H. WADDINGTON  2,243,689
PHOTOGRAPHIC CAMERA
Filed July 8, 1938  4 Sheets-Sheet 4
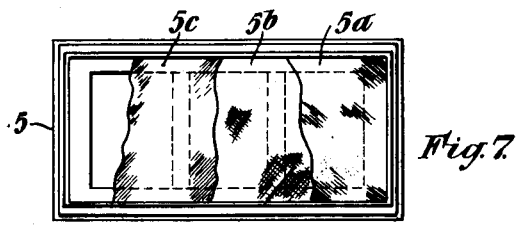
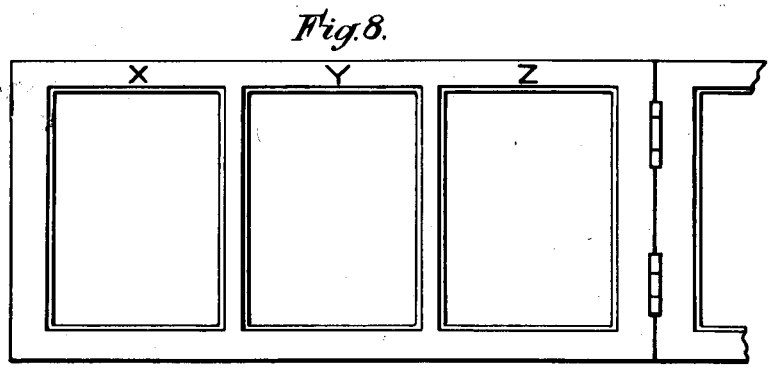
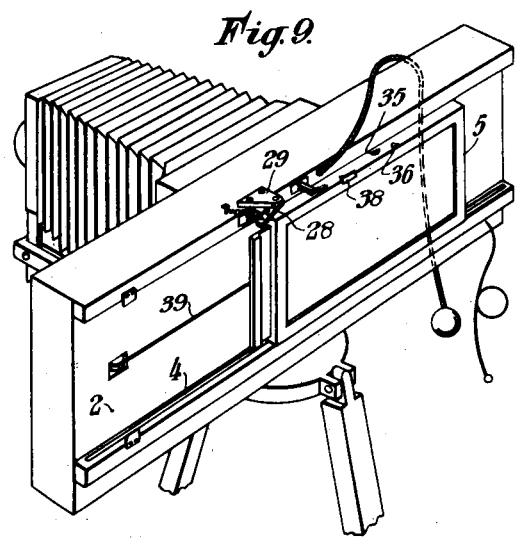
INVENTOR:
DAVID GEORGE HENRY WADDINGTON
BY Francis E. Boyce
ATTORNEY Patented May 27, 1941

2,243,689

UNITED STATES PATENT OFFICE 2,243,689

PHOTOGRAPHIC CAMERA

David George Henry Waddington, Bournemouth, England

Application July 8, 1938, Serial No. 218,059
In Great Britain November 9, 1937

4 Claims. (Cl. 95—2)

The invention relates to photographic cameras of the type adapted to make a plurality of exposures each through a separate color filter in association with a sensitive plate to produce images which are subsequently superimposed to give a color rendering of the subject.

More particularly the invention relates to cameras of the above kind and having a repeating back, i. e. one in which the back is enlarged to accommodate a dark slide adapted to be moved step by step past an aperture in the back of the camera and having in association a plurality of color filters or screens one for each position so that the individual sensitive plates, films or the like positioned in the dark slide are exposed successively through its associated color screen. It will of course be appreciated that a single plate, film or the like may be used in which case only a part will be exposed each time.

Apparatus of this kind is already known but the known constructions have several disadvantages. In the first place to get the best results it must be possible to set with a fine degree of accuracy the individual exposures in order to secure the necessary ratio between the various exposures according to the characteristics of the particular plate or film and its associated color filter. Hitherto where the smallest time adjustment obtainable was ⅕ second some attempt has been made to secure a more accurate ratio by lengthening the time of the individual exposures.

Such apparatus, however, while giving fairly satisfactory results with still life subjects where the object to be photographed is stationary, is unsuitable for objects which are liable to movement owing to the time necessary in moving each plate or part of a plate (when one large plate is used to take all exposures) into register with the aperture in the back of the camera.

It will also be readily understood that considerable skill is necessary in making such adjustments and once set it could not be assumed that the ratio would remain the same over any appreciable period of time.

The object of the present invention is to provide an apparatus of the above general type which shall be entirely automatic in its action wherein differences in length of each exposure due to the particular plate or filter employed can be easily provided for, wherein the length of time required for the exposing of the various plates can be reduced to a minimum, a very desirable proviso in taking portraits or other subjects liable to movement during the various exposures and also wherein the ratio selected will remain substantially constant.

With the foregoing objects in view, the present invention provides a repeating back camera for use in color photography comprising a dark-slide carrier, color differentiating light filters operatively associated with said dark-slide carrier, a detachable and interchangeable roller blind shutter, said shutter having a plurality of apertures, each aperture being of fixed size proportioned according to the exposure required to be given thereby as determined by the color of the filter employed and the color sensitivity of the make of plate or film employed, tensioning means for moving said dark-slide carrier, tensioning means for moving said roller blind shutter, pinion, rack, cam, tappet and stop mechanism for interrupting the movement of said dark-slide carrier so that said dark-slide carrier and said shutter both make step-by-step movements, the movements of one alternating with the movements of the other, whereby plates or films for successive color separation negatives are exposed through successive apertures, mechanism for resetting said dark-slide carrier and said shutter, means for holding said dark-slide carrier and said shutter in the set position, and means for releasing same.

The shutter may operate automatically by means of a small clockwork or other motor or by an initial hand movement, or by any other suitable means, while the same movement may also give the desired periodic movement to the color filters which may be placed either in front of or behind the shutter or may be contained in the dark-slide in front of the plates or in the carrier for the dark-slide.

The roller blind is preferably mounted on two transversely disposed rollers having their axes in fixed relation to the camera.

The color filters which are preferably formed of sheets of stained gelatine in the usual way are adapted to move in unison with the movement of the dark-slide containing the light sensitive plates and may be disposed either to the front or the rear of the roller blind shutter, and may be moved or operated as already mentioned by the mechanism which operates the roller blind shutter.

The camera may be so constructed that the carrier for the dark slide and shutter are directly and dependently operable through the intermediary of mechanism which permits of each being released and stopped alternately and successively. In one construction to effect the movement of the various parts one of the spindles or rollers associated with the roller blind shutter may be rotated by a clockwork motor or otherwise and the other roller provided with a pinion adapted to engage a rack carrying projections, the movement of which due to the rotation of the pinion operates stops controlling the movement of the dark-slide containing the light sensitive plate or plates or the like, the arrangement being such that when the projections on the rack have reached certain predetermined points one of these projections causes pins or other stops to be withdrawn to allow the movement of other mechanism to give a corresponding movement to the dark-slide and cause the dark-slide to be moved to bring the next succeeding plate into alignment with the aperture in the rear of the camera whilst at the same time the next desired color filter is moved into position to take a further exposure on another plate and through that filter. Another projection will engage stops which control the movement of the rack itself, and the mechanism operating the roller blind shutter.

The elongated back of the camera already referred to may be so constructed as to permit the dark-slide to be moved into the various positions necessary to bring each plate into alignment with the opening in the back to take the exposure. The dark-slide or the carrier for same may travel across the back in rails or guides or by other suitable means and may be propelled by clockwork or other motor or by initial hand-movement or by any other suitable means.

In order that the invention may be more clearly understood reference will now be made to the accompanying drawings wherein:

Fig. 1 is a rear elevation of the back of a camera.

Fig. 2 is a front elevation of the camera back shown in Fig. 1.

Fig. 3 is a plan of the camera back shown in Fig. 1.

Figs. 4 and 5 are respectively sections along lines 4—4 and 5—5, Fig. 3, looking in the direction of the arrows.

Fig. 6 is a part plan broken away, illustrating the rack and tappet mechanism.

Fig. 7 is an elevation on a reduced scale, broken away, illustrating the carrier.

Fig. 8 is a part elevation illustrating the carrier.

Fig. 9 is a perspective view on a reduced scale illustrating the camera.

Fig. 10 illustrates a modification of detail.

In the form shown in the drawings the camera back 2 is formed with a central aperture 3 and is provided with grooves 4 to receive a dark-slide carrier 5, which is provided with three light filters 5a, 5b, 5c in front and with distinguishing marks e. g. x, y, z to indicate the correct color plates. Rails and antifriction rollers (not shown) may be incorporated to ensure a free movement of the carrier 5. Within the back 2 are mounted the roller blind rollers 6 and 7 carrying the roller blind shutter 8. The spindle of the roller 6 passes through the top of the back 2 and is provided with a pinion 9 which is engaged by a rack 10 slidably mounted in a rack groove 11 formed along the top of the platform 11a. The rack 10 is retained in the rack groove 11 by a bracket 12. The rack 10 which is square cut is provided at its forward end, which is square cut, with a cam 14 mounted on top thereof. Rotation of the blind roller 6 is therefore controlled by the rack 10 the roller blind tensioning device tending to urge the rack forward along the groove 11. The tensioning and winding mechanism for the roller blind shutter 8 comprises a clockwork motor 13 driven by a spring 15 and coupled by a kind of universal joint 16 to the spindle 17 of the shutter roller 7 for working said roller, the joint 16 allowing a certain amount of play.

For re-setting the shutter a cord 18 and a pulley 19 are provided, the pulley 19 being connected by a kind of universal joint 20 to the spindle 20a of the roller 6.

Assuming the cord 18 fully wound on the pulley 19 when cord 18 is pulled it rotates the pulley 19 and resets the shutter 8, and at the same time rotating roller 7. The rotation of the roller 7 during resetting of the shutter 8 winds up the clockwork motor 13.

Slidably mounted on the platform 11a and passing through the back 2 in a direction transverse to the rack 10 are tappets 21, 22, 23 and 24 arranged in pairs. One end of each of the tappets 21 and 23 are positioned to be engaged by the cam 14 whilst one end of each of the tappets 22 and 24 are positioned to be engaged by the square forward end 10a of the rack 10. The other end of each of the tappets 21, 22 and 24 are turned downwardly to form stops 25, 26 and 27 respectively whilst the other end of the tappet 23 is turned up to engage a stop lever 28 pivoted to a bracket 29 mounted on the top 2a of the back 2. All the tappets are urged inwardly towards the rack 10, suitable stops being provided to limit such movement.

The top of the dark-slide carrier 5 is provided with a front cam 35, a rear cam 36, a front stop 37 and a rear stop 38. The carrier 5 is urged along its track by a cord 39 connected at its other end to the drum 40 of a tensioning device after passing over suitable guide pulley 41.

Also mounted on top of the back 2 are guides 50 for a setting stop 51 adapted to hold the rack 10 in the set position and to be manually operated to release the mechanism.

The operation of the device is as follows. The roller blind shutter is wound on to the roller 6 until the rack 10 has moved far enough for the front end to be engaged by the setting stop 51 and is held thereby. The dark-slide carrier is then moved along its track in the same direction until the front stop 37 thereon passes and engages with the stop 25 on the tappet 21. The dark-slide loaded with plates or films each with its associated color filter is then fixed in the carrier 5 and the slide withdrawn. The camera is now loaded and set.

On withdrawing the stop 51 the rack 10 is released allowing the shutter to unroll and expose the first plate. Immediately the aperture in the shutter has passed the aperture 3 in the back of the camera the cam 14 on the rack 10 engages the tappet 21 moving the stop 25 out of the path of the stop 37 thereby releasing the carrier 5. Further movement of the rack 10 after releasing the carrier 5 is prevented by the forward end engaging the tappet 22.

Immediately on being released the carrier 5 moves rapidly to the second position in which the rear stop 38 abuts against the stop 28a on the underside of the pivoted lever 28. Just before this position is reached the front cam 35 engages the stop 26 on tappet 22 again releasing the rack 10 to start the second movement of the roller blind shutter and expose the second plate.

The action of the mechanism during the second stage is very similar to the first. Immediately the second exposure has been made the cam 14 engages the tappet 23 which moves the stop 28 out of the path of the stop 38 and further movement of the rack 10 is prevented by contact with the tappet 24.

The carrier 5 then moves to its third and final position at the end of its travel and just before reaching the end the rear cam 36 coacts with the stop 27 withdrawing the tappet 24 from out of the path of the rack 10 and releasing the shutter for the final exposure.

It will be obvious that the device can be modified without departing from the scope of the invention for example the filter screens may be mounted in an outer metal frame or between optical plates or otherwise. The roller blind shutter may be formed in sections flexibly connected one to the other as may be desired. The material of the shutter may be fabric, metalised, rubberised or otherwise, or thin metal plates may be used.

It will be understood that the length of apertures in the shutter can be varied according to the characteristics of the filters and also of any particular make of plate employed and various other modifications may be made in the construction hereinbefore referred to in the scope of the appended claims.

As illustrated in Fig. 10 modified means may be provided for turning the roller 7 and such modified means may comprise a spring loaded roller 52 (similar to an ordinary blind roller) with a tensioning device 53, 54, 55 and a calibrated scale 56 and pointer 57 to indicate the state of the tension.

With a device made according to this invention the movements of the shutter and dark-slide carrier are automatic and interdependent. The shutter apertures are predetermined and therefore the ratios of the exposures are substantially fixed irrespective of the speed of the shutter so that the balance of the exposure is assured, thus eliminating the loss of balance which is one of the chief causes of so many failures and disappointments.

What I claim and desire to secure by Letters Patent is:

1. A repeating back camera for use in color photography comprising track means for receiving a dark-slide carrier, a dark-slide carrier provided with colour differentiating means, roller blind rollers carrying a roller blind shutter having exposure proportioned apertures, a pinion carried by one of said rollers and engaged by a rack slidably mounted on the top of the platform, a cam device on said rack, tensioning and winding mechanism for the roller blind, means for resetting the shutter and for winding up the motor, movable tappet means for engaging said cam device, movable tappet means for engaging said rack, stop movable tappet means, a stop lever device pivotally connected to the camera back, means carried by said tappet means to engage said lever device, means carried by the dark-slide carrier for engaging said tappet means, means for holding the rack in the set position and for releasing the mechanism.

2. A repeating back camera for use in color photography comprising a centrally apertured back, track means for receiving a dark-slide carrier, a dark-slide carrier provided with light filters within the back, roller blind rollers carrying a roller blind shutter having exposure proportioned apertures, a spindle to one of said rollers passing through the top of the back and provided with a pinion engaged by a rack slidably mounted in a rack groove formed along the top of the platform, means for retaining said rack in the groove, a cam on said rack, tensioning and winding motor mechanism for the roller blind, means for resetting the shutter and for winding up the motor, tappet means for engaging said cam, tappet means for engaging the forward end of the rack, stop tappet means, a stop lever device pivoted to a bracket on the top of the camera back, means carried by said tappet means to engage said lever device, said tappet means having a movement towards said rack, means carried by the top of the dark-slide carrier for engaging said tappet means urging the carrier along its track, means for holding the rack in the set position and for releasing the mechanism.

3. A repeating back camera for use in color photography comprising a centrally apertured back, track means for receiving a dark-slide carrier, a dark-slide carrier provided with light filters and means for indicating the correct color plates, within the back roller blind rollers, carrying a roller blind shutter having exposure proportioned apertures, a spindle to one of said rollers passing through the top of the rack and provided with a pinion engaged by a square cut rack slidably mounted in a rack groove formed along the top of the platform and retained in the groove by a bracket, a cam on the forward end of said rack, tensioning and winding motor mechanism for the roller blind, means for resetting the shutter and for winding up the motor, slidably mounted on the platform and passing through the back in a direction transverse to the rack pairs of tappets, means carried by some of said tappets for engaging said cam, means carried by some of said tappets for engaging the forward end of the rack, stop means carried by some of said tappets, a stop lever pivoted to a bracket on the top of the camera back, means carried by one of said tappets to engage said lever, said tappets having a limited inwardly urged movement towards said rack, cams carried by the top of the dark-slide carrier for engaging said tappets, means for urging the carrier along its track, means for holding the rack in the set position and means for manually releasing the mechanism.

4. A repeating back camera for use in color photography comprising a centrally apertured back, grooved members to receive a dark-slide carrier having three light filters in front and distinguishing marks to indicate the correct colour plates, within the back two roller blind rollers carrying a roller blind shutter, said shutter having a plurality of apertures, each aperture being proportioned according to the exposure required to be given thereby as determined by the color of the filter employed and the color sensitivity of the plate employed, a spindle to one of said rollers passing through the top of the back and provided with a pinion, a square cut rack engaged by said pinion and slidably mounted in a rack groove formed along the top of a platform, a bracket retaining said rack in said groove, a cam mounted on top of said rack, tensioning mechanism to said roller blind, to urge the rack forward along the groove, winding mechanism to said blind, said mechanism including a clockwork motor driven by a spring, and coupled by a kind of universal joint allowing play with the spindle of the shutter roller for working said roller, a cord and a pulley for resetting the shutter, a kind of universal joint connecting said pulley to the spindle of the roller, so that the rotation of the roller during resetting of the shutter winds up the motor, two pairs of tappets slidably mounted on the platform and passing through the back in a direction transverse to the rack, one end of one of each pair of tappets being positioned to be engaged by the cam, and one end of the other of each pair of tappets being positioned to be engaged by the square forward end of the rack, the remaining end of one of the first-mentioned tappets and of each of the second-mentioned tappets being turned downwardly to form a stop, whilst the remaining end of the other of the first-mentioned tappets is turned up to engage a stop lever pivoted to a bracket mounted on the top of the back, all the tappets being positioned to be urged inwardly towards the rack, suitable stops for limiting such movement, on the top of the dark-slide carrier for engaging said tappets a front cam, a rear cam, a front stop and a rear stop, a tensioning device provided with a drum, a cord attached at one end to said drum and passing over a guide pulley to urge the carrier along its track, on the top of the back guides holding a setting stop to hold the rack in the set position and to be manually operated to release the mechanism.

DAVID GEORGE HENRY WADDINGTON.